United States Patent [19]

Hanson et al.

[11] Patent Number: 4,846,919
[45] Date of Patent: Jul. 11, 1989

[54] ATTACHING SOLES TO SHOES

[75] Inventors: Raymond Hanson, Leicester; Christopher M. Allen, Loughborough, both of England; Karl-Heinz Albert, Oberursel; Hubertus von Voithenberg, Bad Homburg, both of Fed. Rep. of Germany

[73] Assignee: Emhart Industries, Inc., Farmington, Conn.

[21] Appl. No.: 166,771

[22] Filed: Mar. 4, 1988

Related U.S. Application Data

[63] Continuation of Ser. No. 930,604, Nov. 12, 1986, abandoned.

[30] Foreign Application Priority Data

Jun. 20, 1986 [GB] United Kingdom ............... 8615062

[51] Int. Cl.$^4$ .............................................. C09J 5/02
[52] U.S. Cl. ............................... 156/307.5; 12/142 F; 12/142 T; 36/19.5; 36/DIG. 1; 156/153; 156/273.3; 156/307.3; 156/310; 156/314; 156/320; 156/324.4; 156/331.4; 156/331.7

[56] References Cited

U.S. PATENT DOCUMENTS

| | | | |
|---|---|---|---|
| 3,116,501 | 1/1964 | Markevitch | 36/19.5 |
| 4,156,064 | 5/1979 | Falkenstein et al. | |
| 4,618,651 | 10/1986 | Gilch et al. | 525/130 |

FOREIGN PATENT DOCUMENTS

| | | |
|---|---|---|
| 0043645 | 1/1982 | European Pat. Off. |
| 0092320 | 10/1983 | European Pat. Off. |
| 0125008 | 11/1984 | European Pat. Off. |
| 0125009 | 11/1984 | European Pat. Off. |
| 1249015 | 10/1971 | United Kingdom |
| 1540634 | 2/1979 | United Kingdom |
| 2042868 | 10/1980 | United Kingdom |
| 2098884 | 12/1982 | United Kingdom |
| 2137638 | 10/1984 | United Kingdom |

Primary Examiner—John J. Gallagher
Attorney, Agent, or Firm—Thomas S. Szatkowski

[57] ABSTRACT

Method of bonding a sole to a shoe by applying moisture-curable melt adhesive to the shoe upper, subjecting the adhesive coating to a hot-cure step with airborne moisture, and pressing the sole and shoe upper together with the adhesive between them immediately after the hot-cure step, preferably in less than 90 seconds after leaving the hot-cure. The bond is effected without application of adhesive to the sole, which is merely pretreated by wiping with solvent or primer solution.

2 Claims, No Drawings

4,846,919

ATTACHING SOLES TO SHOES

This is a continuation of co-pending application Ser. No. 930,604 filed on Nov. 12, 1986, now abandoned.

BACKGROUND OF THE INVENTION

1. Field of the Invention

The present invention relates to the attaching of soles to shoes using moisture-curable melt-adhesives.

2. Description of the Prior Art

So-called "two-way cementing systems" are well known in the shoe industry in which adhesive is applied to the contact surface of a sole and to the contact surface of a shoe bottom and creating a bond by bringing the contact surfaces of sole and of shoe bottom together under pressure.

The efficiency of such processes may be measured both in the performance of the product (the shoe) and in the demands of time, cost, space, safety, etc. of the manufacturing operation.

Neoprene-based adhesives provided satisfactory results with two-way cementing systems but, being solvent-based, present new problems related to solvent removal, including general environmental disadvantages and undesirable working conditions.

Polyurethane-based adhesives when used initially, although inherently compatible with a wider range of materials, were still solvent-based but with somewhat reduced levels of solvent-removal difficulties.

In U.K. patent specification GB No. 2,137,638 is described and claimed a so-called solvent-free adhesive which is a moisture-curable composition comprising polyurethane pre-polymers and its use in bonding a sole to a shoe upper is also claimed.

The method of GB No. 2,137,638 for bonding a sole to a shoe upper comprised the steps of providing on attaching surfaces of one or both of the sole and shoe upper a layer of adhesive composition, exposing each layer of adhesive composition of air-borne moisture to bring chain extension of the polyurethane, heating the layer or at least one of the layers of the adhesive composition to bring it to tacky adhesive condition, pressing the attaching surfaces of the sole and upper together with the composition between them and bringing about cooling of the composition to form an adhesive bond between the sole and the shoe upper. That is to say, this process required a step of heating at least one layer of adhesive to bring it to tacky adhesive condition (activation) before pressing sole and upper together to form an adhesive bond.

It is an object of the present invention to provide an improved method of bonding a sole to a shoe using a moisture-curable melt adhesive.

SUMMARY OF THE INVENTION

According to the present invention, we provide a method of bonding a sole to a shoe in which a moisture-curable melt adhesive is applied to either the sole and/or shoe upper, the adhesive coating is subjected to a hot-cure step with air-borne moisture, and the sole and shoe upper are pressed together with the adhesive between them, characterised in that the pressing takes place immediately after the hot-cure step, preferably in less than 90 seconds after leaving the hot-cure.

DESCRIPTION OF THE PREFERRED EMBODIMENT

The sole and/or shoe upper may be subjected to pre-treatment, e.g. by roughing, before the moisture-curable adhesive is applied.

In the case of certain sole materials, such as PVC, thermoplastic rubber or polyurethane, it may be possible to effect the bond without application of the moisture-curable adhesive to the sole, but merely to pretreat the soles e.g. by wiping with solvent or primer solution in the way known for polyurethane adhesive. Preferably the soles are spotted (brought together for bonding) in less than 60 seconds after the uppers leave the hot-cure.

The elimination of the separate activation (heating) step in the method of the present invention gives rise to significant economies in time, labour and energy and often also to reduction in quantity of adhesive used. However, in some circumstances it may be necessary to subject a component (sole or shoe) not coated with moisture-curable adhesive to a brief heat treatment.

In some shoe factories it is the practice to coat soles at least one day before they are used. The coating may be a moisture-curable polyurethane, which can cure slowly in ambient temperature and humidity conditions, and this cure can be initiated by the brief application of heat after application of the polyurethane adhesive composition followed by slow cure in ambient conditions. In order that the sole should not unduly chill the shoe upper leaving the hot-cure, the stored (and thus-cooled) sole may be heated prior to bringing the contact surfaces of sole and shoe upper together.

Alternatively, the sole may be coated with a moisture-curable adhesive and subject to a hot-cure step with air-borne moisture before being pressed with the shoe upper which has been subjected to a similar hot-cure step.

Preferably the moisture-curable adhesive is applied to sole or shoe upper as a thin film of 0.1–0.3mm. In applying the adhesive, adequate heat must be present to ensure adequate "wet-out" of the adhesive and it is sometimes necessary to supply heat for this purpose. Although delays of up to 30 minutes or even one hour can be tolerated, the hot-cure step usually follows immediately after application of the adhesive. The temperature of the hot-cure step must be higher than the crystalline melting point of the adhesive, usually 70°–120° C., preferably 100°–110° C. The hot-cure is carried out in a substantially enclosed chamber with 10–70%, preferably less than 30% relative humidity. However, the humidity used is partially dictated by the nature of the materials used; for example, with many commonly-used leathers a dew-point of 60° C. should not be exceeded if water staining is to be avoided. The hot-cure step may last from 10 seconds to 5 minutes, but preferably 30 to 120 seconds.

A fast-curing, hot-melt composition is usually applied to shoe uppers. It may in some cases be advantageous to cool the adhesive somewhat after the hot-cure step but the temperature should not be allowed to drop below the crystalline melting point of the adhesive. The slow-curing hot-melt composition which may be applied to soles usually has a long activation time, like the adhesives described in U.S. Pat. No. 4,618,651. They will cure in ambient conditions of say 20°+5° C. and 20–70% RH in periods up to 24 hours and may be reactivated after periods varying from 24 hours to 6 months.

As explained above, the cure of the adhesive applied to the sole may be expedited by initial brief subjection to heat, for example by heating to a temperature of about 85° C. for 4 to 6 seconds before cure under ambient conditions.

In order that the invention can be better understood, preferred embodiments will now be described in greater detail by way of example.

EXAMPLE 1 (Adhesive-coated soles and uppers)

Both sole and shoe upper of leather, subjected to a rouging treatment before application of a thin film (0.1–0.3mm) of a fast-curing hot-melt composition. The adhesive layers on both components were then subjected to a hot-cure by a 3 1/2 minute passage through a two-zone chamber with a humidity showing 60° C. dew point; the first zone was 90° C. and the second zone was 110° C. Ecellent tack was demonstrated on spotting and after pressing for 12 seconds green strength was shown by a peel strength of 14 N/cm measured 15 seconds after pressing. Matured bond strength after 5 days storage at 23° C. /50% RH gave 163 N/cm (material failure).

EXAMPLE 2 (pre-cemented soles)

Thermoplastic rubber soles were primed with a 2% solution of UNIGRIP 300 (RTM) in acetone and dried. They were then coated with a thin (0.1–0.3mm) film of BOSTIK 7803 (RTM), a slow-curing hot-melt adhesive, and stored for 3 days under ambient conditions.

Leather shoe uppers were given a roughing treatment and then coated with a thin film of BOSTIK 9801 (RTM), a fast-curing hot-melt adhesive. These adhesive coatings were cured for 30 seconds in a rapid curer (distanced 8 cm from a heating plate having a surface temperature of 360° C.; the humidity showed a dew point of approx. 60° C.) Soles and shoe uppers were spotted immediately after leaving the rapid curer and pressed for 15 seconds. Peel strength of the bonds was measured as 13 N/cm 15 seconds after pressing the 19 N/cm 30 seconds after pressing. Double the pressing time to 30 seconds gave an initial peel strength of 31 N/cm 15 seconds after pressing and 46 N/cm 30 seconds after pressing.

The matured bond strength after 5 days storage at 23° C./50% RH gave 120 N/cm (material failure).

EXAMPLE 3 (Uncoated soles)

Thermoplastic rubber soles were primed with a 2% solution of UNIGRIP 300 (RTM) in acetone. Leather shoe uppers were rouged and then coated with a thin film (0.1–0.3mm) of a fast-curing hot-melt adhesive. The adhesive coating on the shoe uppers were cured for 30 seconds in a rapid curer (distanced 8cm from black heating plates with a surface temperature of 360° C.; the humidity in the chamber of the rapid curer showing a dew point of approx. 60° C.). The soles and shoe uppers were spotted immediately on leaving the curer and displayed excellent tack. After pressing for 15 seconds the initial peel strength was measured as 18 N/cm 15 seconds after pressing and 32 N/cm 30 seconds after pressing. The material bond strength after 5 days storage at 23° C./1 50% RH gave 110 N/cm (material failure TPR).

We claim:

1. A method of bonding a PVC, thermoplastic rubber or polyurethane shoe sole to a shoe upper which consists of:
    pretreating the PVC, thermoplastic rubber or polyurethane sole by wiping with a solvent or primer solution;
    applying a fast-curing moisture-curable hot melt adhesive to the shoe upper;
    immediately after the application of said adhesive, subjecting the adhesive to a hot-cure step with airborne moisture for a time of from about 30 to about 120 seconds at a temperature of about 100° C. to about 110° C. and a relative humidity of less than 30%; and
    pressing the shoe upper and the sole together with the adhesive between them in less than immediately after the shoe upper has left the hot-cure step.

2. The method of claim 1 wherein the moisture curable adhesive is applied to the shoe upper as a thin film of 0.1–0.3mm.

* * * * *